United States Patent [19]

Goodwin, Sr.

[11] 4,122,962
[45] Oct. 31, 1978

[54] TRAILER

[76] Inventor: Wayne M. Goodwin, Sr., 2740 Farmers Branch Lane, Dallas, Tex. 75234

[21] Appl. No.: 812,819

[22] Filed: Jul. 5, 1977

[51] Int. Cl.² ........................... B60P 1/14; B60P 1/16
[52] U.S. Cl. ................................................... 214/394
[58] Field of Search ............... 214/390, 392, 394, 396; 254/2 R, 10 R

[56] References Cited

U.S. PATENT DOCUMENTS

| | | | |
|---|---|---|---|
| 2,822,944 | 2/1958 | Blomgren | 214/390 |
| 2,909,298 | 10/1959 | Baudhuin | 214/396 |
| 3,640,413 | 2/1972 | Klein | 214/396 |
| 3,707,238 | 12/1972 | Thibodeau | 214/390 |

FOREIGN PATENT DOCUMENTS 669,724  9/1965  Belgium ................................. 214/396

Primary Examiner—Robert G. Sheridan
Attorney, Agent, or Firm—Hubbard, Thurman, Turner, Tucker and Glaser

[57] ABSTRACT

A trailer with loading and unloading capability. The trailer has side members, but is open at the rear, so that it may be backed into a position with the load between the side members. There are beams along each side member which can be lowered to receive crossbars passed under the load. Means are provided for lifting the beams and the load, supported by the crossbars, into a hauling position. The trailer has columns rising from the side members and brace members interconnecting the columns, which make the trailer strong even though it is open at the rear.

4 Claims, 4 Drawing Figures

U.S. Patent Oct. 31, 1978 Sheet 2 of 2 4,122,962
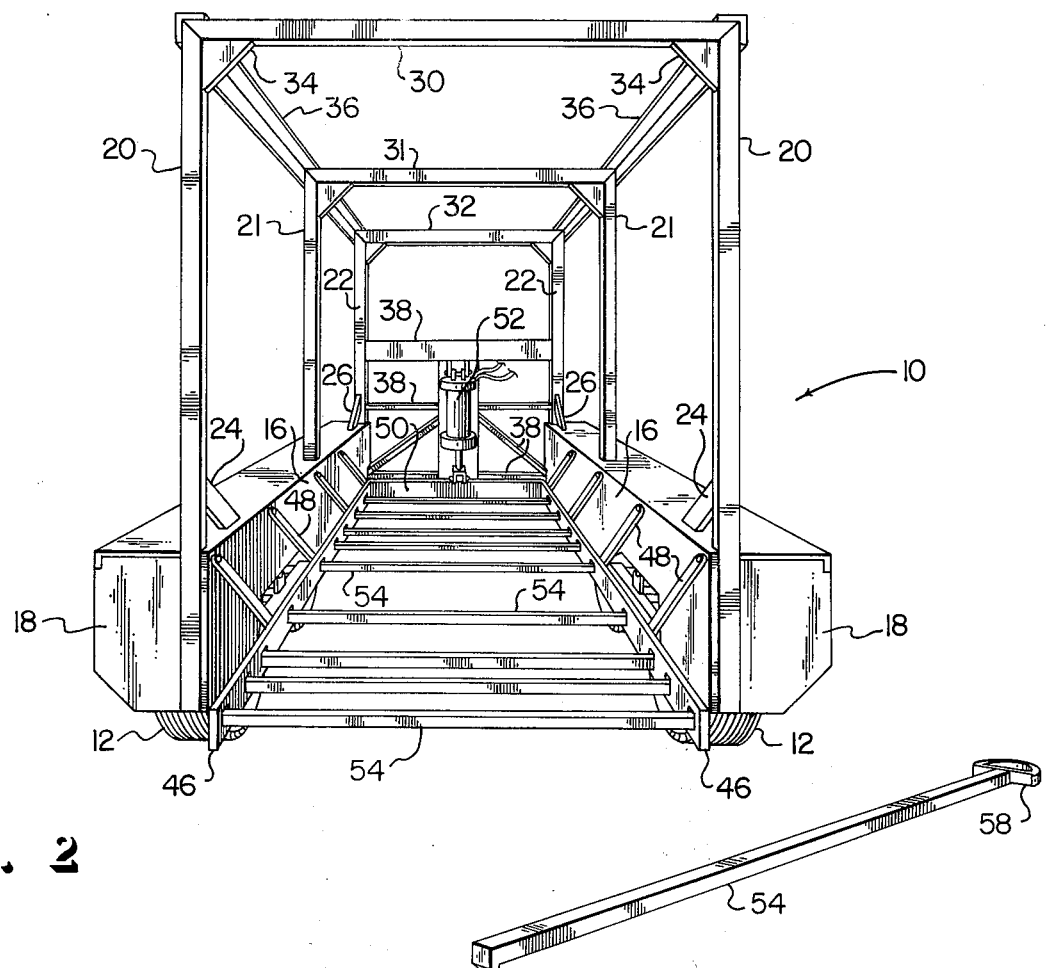
FIG. 2
FIG. 3
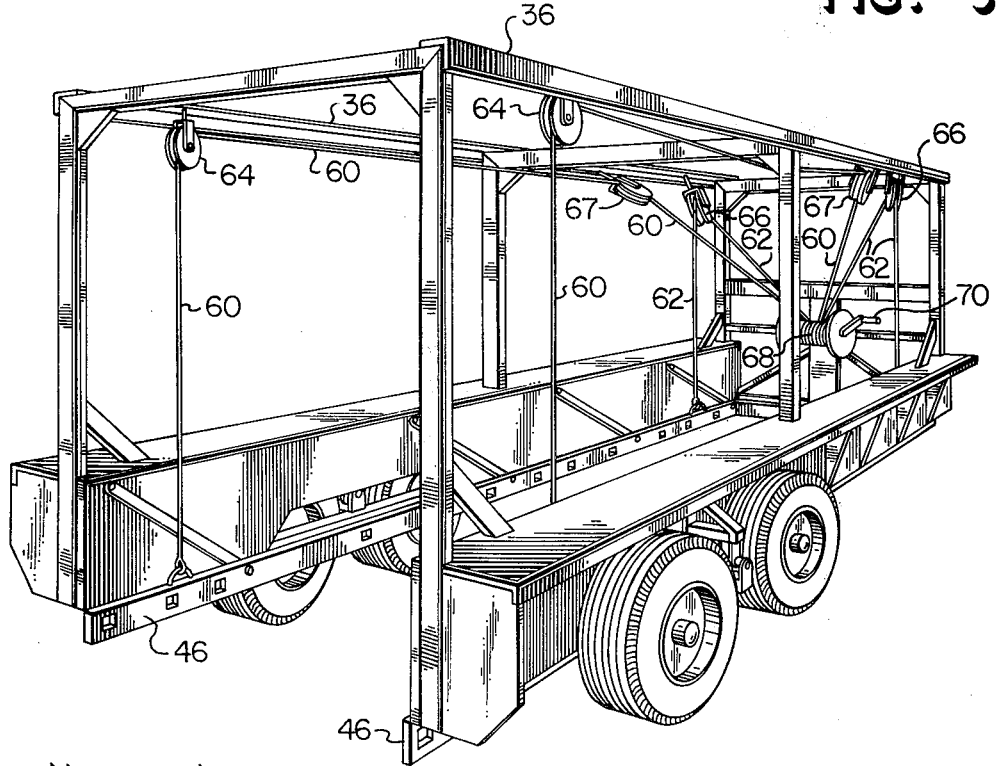
FIG. 4

TRAILER

BACKGROUND OF THE INVENTION

This invention relates to a trailer with loading and unloading capability.

A great variety of goods to be transported by truck or trailer are stored in stacks at a manufacturing or distribution point. Examples are lumber, pipes and bricks. If a trailer can be provided with loading and unloading capability, the stack can be moved on and off the trailer as a whole, usually with considerably less effort than that involved in restacking all the individual items to be transported. This can be accomplished by using a trailer open at the rear so that it can be backed into a position surrounding the load. There must be some means for then raising the load into a hauling position and securing it there.

A trailer with an open rear lacks some of the structural members of an ordinary trailer; therefore, some compensating provision must be made in order to haul long and heavy loads. The items to be transported can be stacked on a pallet specially designed to be hoisted by the trailer and strong enough to provide the required structural integrity for hauling. Unfortunately, this requires an inventory of relatively expensive pallets on which to store stacked items later to be transported. The present invention avoids this problem, providing the capability to pick up and haul a pre-stacked long, heavy load, without resort to special expansive pallets.

SUMMARY OF THE INVENTION

In accordance with the present invention there is provided a trailer having two wheel assemblies and two lower side members, each member supported above the ground by a different one of the wheel assemblies. The side members extend beside each other in the direction of hauling and are separated to receive a load in the space between the members. A front brace member rigidly interconnects the two lower side members near the front portions thereof. Two vertical columns are each rigidly mounted on a different one of the side members, near the rear portions thereof. A rear brace member rigidly interconnects the columns substantially above the lower side members, whereby the trailer may be moved into position with respect to the load, with the load being received between the side members at the rear thereof and passing below the rear brace member. In addition, there are two beams, each alongside a different one of the side members, having portions for receiving crossbars supported between the beams. The beams are lowered to a loading position near the ground by means also capable of raising the beams to a hauling position. In the loading position, the crossbars may be installed under a load located between the side members; then the load can be raised to a hauling position.

In a preferred embodiment of the invention, the means for lowering and raising the beams includes a plurality of parallel support members for each beam. Each support member is pivotally connected at one end to the beam and, at the other end, to the lower side member located alongside the beam. Each of the support members is of the same length between the two end connections thereof. The beams are raised and lowered by a hydraulic unit or a pulley system. The pivoting support members hold the beams parallel to the side members of the trailer as the beams are lowered and raised.

The trailer according to the present invention is capable of loading and hauling long heavy loads. Even though the trailer is open at the rear, the vertical columns and rear brace member provide the load bearing capability and rigidity required. No pallet is required for structural stability.

Neither is any special pallet required for the loading process. A load may be stacked on ordinary wooden pallets or blocks that allow the crossbars to be installed in the beams, when the beams are in the loading position near the ground.

BRIEF DESCRIPTION OF THE DRAWINGS

FIG. 2 is a perspective view of the trailer as seen directly from the rear.

FIG. 3 is a perspective view of a crossbar used with the trailer.

FIG. 4 is a perspective view of an alternate embodiment of the trailer, as seen from the right rear corner.

DESCRIPTION OF THE PREFERRED EMBODIMENT

Figure 1:
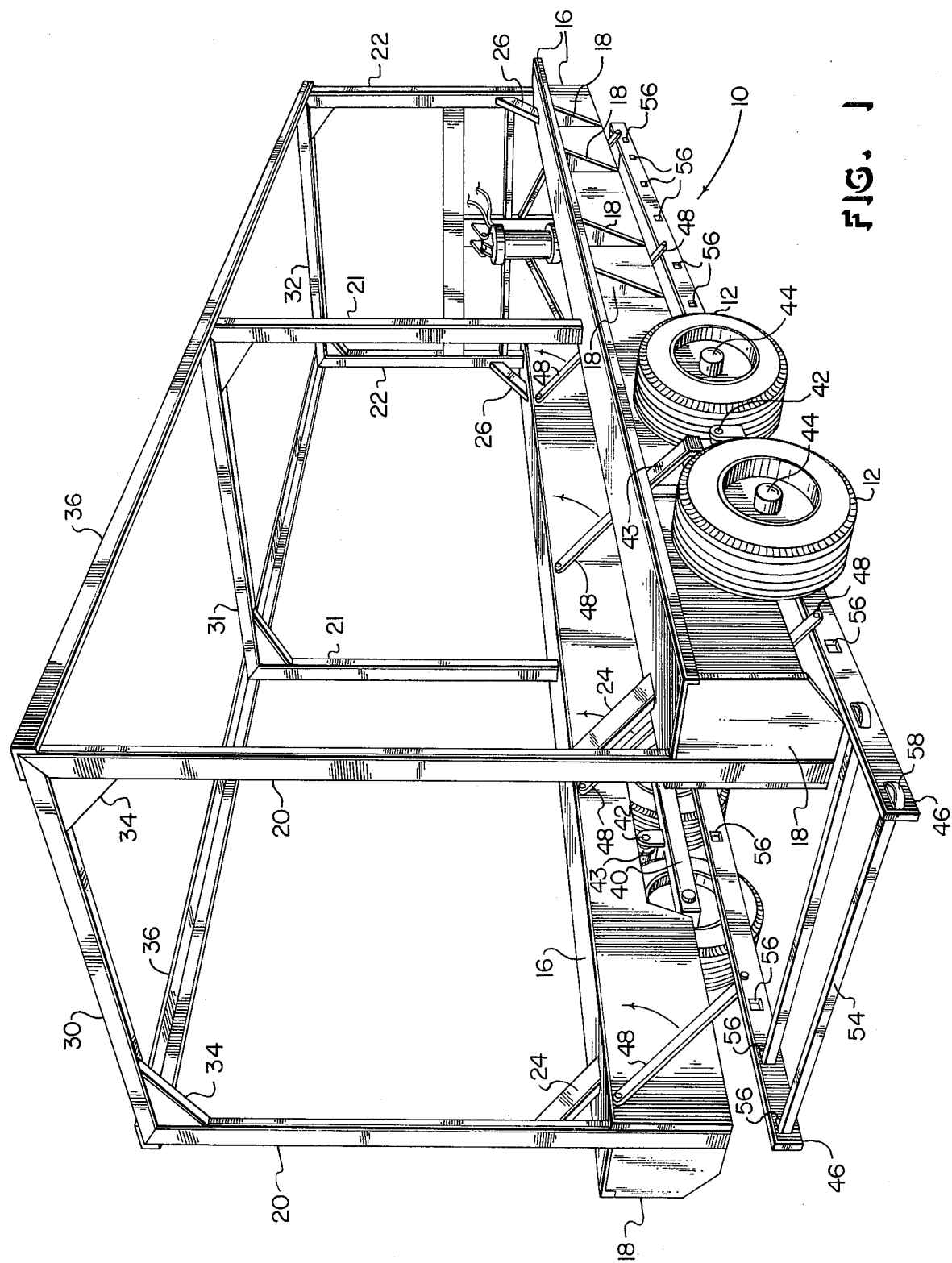
FIG. 1 is a perspective view of a trailer according to the invention, as seen from the right rear corner.

FIGS. 1 and 2 show a trailer in accordance with the invention, indicated generally by the reference numeral 10. The trailer is supported, in front by a conventional hitch (not shown), and near the rear of the trailer by wheel assemblies 12 on each side. Each wheel assembly is pivotally mounted with respect to one of lower side members 16. The lower side members are formed of metal plates to have generally the configuration of a large beam with an L-shaped cross-section. The side members 16 are structurally reinforced by brackets 18.

Pairs of vertical columns 20, 21 and 22 are spaced along the lower side members 16. The columns are channel beams, welded or otherwise suitably rigidly connected to the lower side members. As can be seen from the figure the channels are of a relatively large cross-section, and columns 20 and 22 are braced by buttresses 24 and 26 respectively. Interconnecting the tops of columns 20, 21 and 22 are brace members 30, 31 and 32, respectively. As shown, these brace members are formed of the same channel stock as the columns. Additional rigidity is provided by brackets, such as brackets 34, welded between a column and its associated brace member.

Upper side members 36 rigidly interconnect the tops of columns 20, 21 and 22, running above the lower side members 16. The upper side members are formed of angle iron welded to the brace members. At the front of the trailer, a front brace member assembly 38 rigidly interconnects lower side members 18 and front columns 22.

Each of the wheel assemblies 12 has an arm 40 pivotally mounted with respect to the lower side members 16 at a pivot point 42. The pivot 42 is suspended from side member 16 on an assembly 43. At each end of arm 40 there is an axle 44 with a wheel mounted thereon. As the wheels encounter the irregularities of the road, arm 40 rotates about point 42 with respect to the lower side member 16. Because of this, the wheel assembly does not require the use of springs.

Along the inboard side of each lower side member 16 is a beam 46. The beams 46 are suspended from the lower side members by parallel support members 48. Each of support members 48 is pivotally connected at the top end thereof to one of the lower side members 16 and at the bottom end thereof to one of the beams 46. The distance between the pivot points on each support member 48 is the same, and the upper pivot points thereof are in a line parallel to the bottom of the trailer and, approximately, to the ground. As a result, beams 46 can move up and down, while the rotation of support members 48 maintain the beams 46 parallel to the bottom of the trailer at each height. The beams 46 are rigidly interconnected at the front by a beam 50. A hydraulic unit 52 has the piston thereof pivotally connected to beam 50 and the cylinder thereof pivotally connected to front brace assembly 38.

Along the beams 46 are openings 56. Pairs of openings are formed by opposing openings in the two beams. Each pair of openings is for the purpose of receiving one of the crossbars 54, as illustrated in FIG. 2. The crossbar 54 is shown in FIG. 3. It has at one end a small projection 55 and at the other end a handle 58. When the crossbar is in place, with a load on it, the projection 55 and handle 58 are effective to hold the bar in place.

FIG. 4 illustrates a pulley system, as an alternative to hydraulic unit 52, for raising beams 46. Ropes or cables 60 are attached to beams 46 near the rear portions thereof. The cables 60 pass over pulleys 64 which are suspended from upper side members 36. Also suspended from upper side members 36, near the front portions thereof, are pulleys 67, handling cable 60, and pulleys 66 handling one of the cables 62 connected to the front portion of one the beams 46. After passing over the pulleys 66, cables 60 and 62 from both sides of the trailer are wrapped around drum 68, to which they are attached. Suitable gearing, not shown, is provided, so that drum 68 may be conveniently turned by means of handle 70. As the cables 60 and 62 are reeled in on drum 68, the beams 46 are raised. When the handle 70 is turned to unreel cables 60 and 62, the beams 46 are lowered.

In the use of the trailer 10, it is backed up to a load so that the load lies between the lower side members 16. The load, for example, lumber should be resting on some sort of support such as blocks or ordinary wooden pallets. The hydraulic unit 52 is actuated to extend the piston thereof, lowering the beam 50 and beams 46 to the loading position near the ground shown in FIG. 1. Then the crossbars 54 are inserted in the holes 56 below the load and between the blocks supporting the load or through the spaces in the wooden pallets. When the crossbars 54 have been installed, the hydraulic unit 52 is actuated to withdraw the piston thereof and raise beams 46 to the hauling position shown in FIG. 2. As beams 46 are raised, the crossbars 54 support the load and raise it to the hauling position. To unload, the hydraulic unit is actuaged to extent the piston thereof, lowering beams 46 and the load onto, say, blocks. When the load is resting on the blocks, crossbars 54 may be removed and the trailer 10 pulled away from the load.

Even though the trailer 10 is open at the rear, therefore having no axle and supporting structure running across its entire width, it is structurally capable of hauling long, large and heavy loads. The transverse stability required is provided by brace members 30, which performs much the same load bearing function as an axle. Yet the height of columns 20 allows a high load to be taken in the rear of the trailer 10. Brace members 31 and 32 on columns 21 and 22 add additional transverse stability, and this is further enhanced by the upper side members 36.

No special pallet is required for use with the trailer 10, either for structural strength or loading function. This means that goods to be hauled can be stacked on blocks or ordinary pallets for indefinite storage, then picked up using the trailer 10.

Although preferred embodiments of the invention have been described in detail, it is to be understood that various changes, substitutions and alterations can be made therein without departing from the spirit and scope of the invention as defined by the appended claims.

I claim:

1. A trailer for hauling a load, comprising:
   two lower side members extending beside each other in the direction of said hauling and separated to receive the load in the space between the members;
   two wheel assemblies, each connected to a different one of the side members, on the outboard side thereof;
   a first pair of vertical columns, each rigidly mounted on a different one of the side members, near the rear portion thereof;
   a second pair of vertical columns rigidly mounted on the side members near the front porton thereof;
   first and second brace members associated with the first and second pairs of columns, respectively, rigidly interconnecting the two columns of each pair of points near the tops of the columns and substantially above the lower side members;
   two upper side members, each rigidly interconnecting the columns above a different one of the lower side members, at points of connection near the brace members;
   a front brace member lower than said second brace member, rigidly interconnecting the lower side members near the front portion thereof;
   two beams, each along the inboard side of a different one of the lower side members, said beams having a plurality of oppositely disposed openings defined therein for receiving a plurality of crossbars supported between the beams;
   a crossbeam interconnecting the two beams near the front thereof; and
   means for selectively lowering the beams to a loading position near the ground and raising the beams to a hauling position.

2. The trailer of claim 1, wherein said means for lowering and raising comprises, for each beam, a plurality of parallel support members, each pivotally connected at one end thereof to the beam and, at the other end, to the lower side member located alongside the beam, each support member having the same length between the two pivotal connections thereof.

3. The trailer of claim 2, wherein said means for lowering and raising further includes
   a hydraulic unit having a piston element and a cylinder element, one of said elements being pivotally connected to said crossbeam and
   means fixed with respect to said front brace member for pivotally mounting the other element of the hydraulic unit.

4. The trailer of claim 2, wherein said means for lowering and raising further includes a pulley system having ropes or cables attached to the beams.

* * * * *